Figure 1:
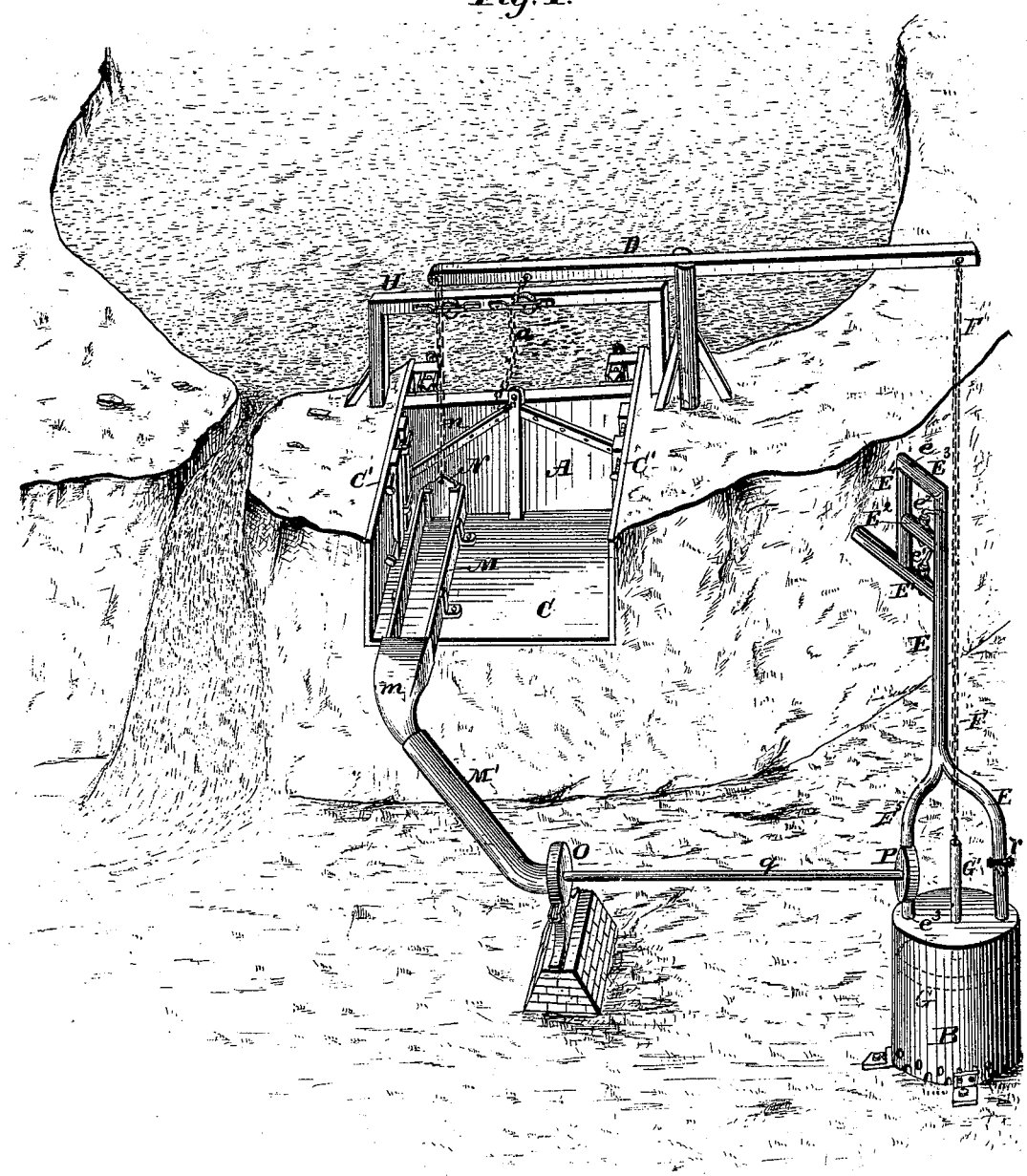

(No Model.) 2 Sheets—Sheet 1.
J. J. LÜCK & H. B. BATEMAN.
Device for Regulating the Head of Water in Mill Dams, Canals, &c.

No. 234,996. Patented Nov. 30, 1880.

Attest:
J. Henry Kaiser
J. A. Rutherford

Inventor:
John J. Lück
and
Henry B. Bateman
By James L. Norris,
Atty.

(No Model.) 2 Sheets—Sheet 2.
J. J. LÜCK & H. B. BATEMAN.
Device for Regulating the Head of Water in Mill Dams, Canals, &c.
No. 234,996. Patented Nov. 30, 1880.
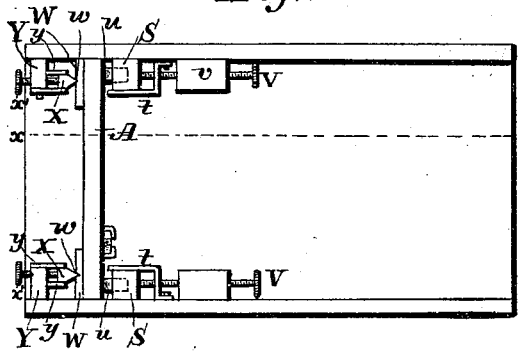
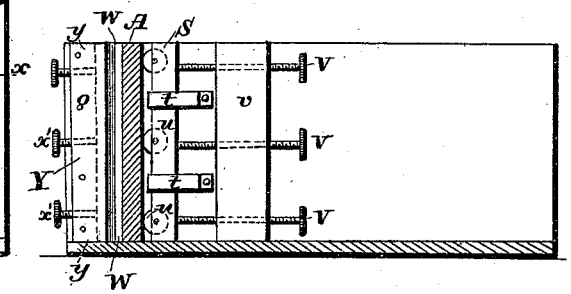
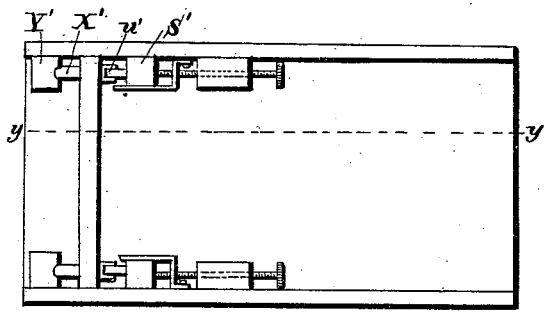
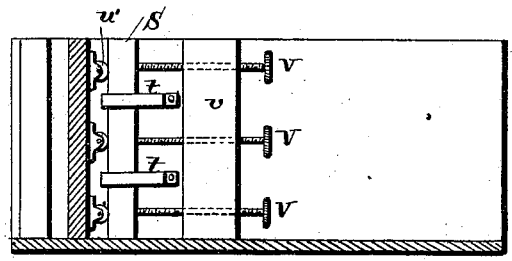
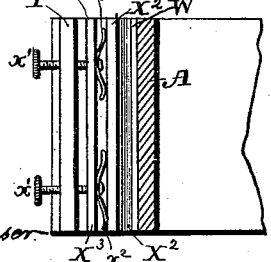
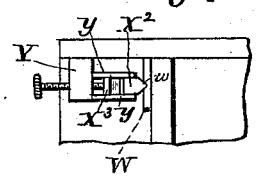
Attest:
J. Henry Kaiser
J. A. Rutherford
Inventor.
John J. Lück
and
Henry B. Bateman
By James L. Norris
Atty

UNITED STATES PATENT OFFICE.

JOHN J. LÜCK AND HENRY B. BATEMAN, OF RIPON, WISCONSIN.

DEVICE FOR REGULATING THE HEAD OF WATER IN MILL-DAMS, CANALS, &c.

SPECIFICATION forming part of Letters Patent No. 234,996, dated November 30, 1880.

Application filed October 21, 1880. (No model.)

*To all whom it may concern:*

Be it known that we, JOHN J. LÜCK and HENRY B. BATEMAN, both citizens of the United States, residing at Ripon, in the county of Fond du Lac and State of Wisconsin, have invented new and useful Improvements in Devices for Regulating the Head of Water in Mills-Dams, Canals, &c., of which the following is a specification.

This invention relates especially to an improvement on the apparatus shown and described in the Letters Patent granted to J. J. Lück, September 14, 1880, and numbered 232,284, for devices for regulating the head of water in mill-dams, the object of the present improvement being to increase the power and rapidity of action of the devices which operate the flood-gate, to reduce the friction incidental to the movement of the sliding gate, and to prevent leakage of water around the vertical edges thereof.

The invention consists, mainly, in a mechanism for automatically controlling or regulating the head or level of water in a watercourse or mill-pond, composed of an outflow-pipe, devices operated by the water therefrom to open the gate of a sluice, and devices operated by the water from said sluice to open a main gate, as hereinafter more particularly described.

It also consists in the combination, with a water-gate, of suitably-supported friction-rollers or wheels arranged to turn against suitable bearings and devices for regulating the pressure between said rollers or wheels and bearings; and it consists, further, in certain devices for preventing leakage of water around the edges of a sliding water-gate, all of which will be hereinafter particularly described.

In the accompanying drawings, Figure 1 is a perspective view, illustrating our improvements. Fig. 2 is a top view of the chute and gates. Fig. 3 is a section on line $x\,x$, Fig. 2, showing an inside view of one of the walls of the chute. Fig. 4 is a top view, illustrating modifications of the friction and leak-preventing devices. Fig. 5 is a section on line $y\,y$ of Fig. 4. Fig. 6 is a sectional view, illustrating modifications of the leak-preventing devices. Fig. 7 is a top view of the same.

A indicates the gate controlling the main chute, which may be arranged at any suitable point in the dam or embankment. $C'$ designates the walls or sides, and C the inclined bottom, of the chute through which the water escapes when the gate is raised. This gate may be of any desired construction, giving it the requisite strength to resist the pressure thereon, and should be weighted so as to work easily between its vertical bearings. It is connected by a chain, $a$, to a lever, D, having its fulcrum in a post, $D'$, or other suitable support, the chain $a$ running on a guide-pulley arranged upon the beam H, which spans the chute, and is supported by suitable posts. When the gate A is down the chain $a$ hangs quite slack, for a purpose which will be presently explained.

The long arm of lever D is connected by a chain, F, with the piston-rod $G'$ of a piston or plunger, G, which works in an open-bottomed cylinder, B, with a surrounding or annular space between it and the cylinder just of sufficient size to permit the escape of the water contained in the cylinder above the piston to the under side of this, where it may pass off through the open bottom of the cylinder or openings in the wall, near said bottom. The cylinder should be firmly secured to the ground or suitable base.

E is a pipe, the upper end of which is made with any desired number of branch pipes, $E'$ $E^2$ $E^3$, the lowermost, $E'$, of which opens into the dam or pond through its embankment. From this lower branch pipe, $E'$, extends a vertical pipe, $E^4$, connecting with the ends of branches $E^2$ and $E^3$. The branches $E'$ and $E^2$ are provided with suitable cocks $e'\,e^2$, by which their passages may be closed; and the branch $E^3$ is provided with a vent-hole, $e$, for a purpose hereinafter explained. The lower end of pipe E connects with two branches, $E^5$ and $E^6$, the latter, $E^6$, of which is connected to the upper or closed end of the cylinder, and the former, $E^5$, is the induction-pipe of a rotary pump, P, the eduction-pipe $e^3$ of which is connected with the upper or closed end of the cylinder. The pipe $E^6$ is provided with a check-valve, $r$, indicated in dotted lines, Fig. 1, which permits the flow of water through it toward the cylinder, but prevents it from flowing from said cylinder back into the pipe. Any ordinary construction of check-valve may be used which will close against a current flowing from the cylinder through the pipe.

The letter M indicates a sluice arranged upon the bottom C of the chute to take water from an opening in the lower portion of the gate A, this opening being provided with a sliding gate, N, arranged to move vertically in guides secured to the main gate. The gate N should be weighted to insure its prompt downward movement. It is connected by a chain, $n$, with the end of the short arm of lever D, which chain is preferably of such length as to be taut when both gates are in their lowermost positions. At the end of the sluice M is arranged a hood, $m$, which guides the water from the said sluice to a pipe, M', the lower end of which furnishes water to a water-motor, O, consisting of a wheel arranged in a suitable casing to be operated by the flow of water through said sluice and pipe. This water-wheel may be of any suitable pattern, though at present represented as taking water at the center. From the shaft or axis of the wheel of water-motor O a coupling shaft or rod, $q$, extends to and is connected with the shaft or axis of the piston of the rotary pump P. The operation of these devices will be presently described.

Upon the inner surfaces of the opposite walls, C', of the chute C are arranged vertical beams S S, supported by guide-brackets $t$, within which said beams may have a lateral movement toward and from the gate. Upon their sides next the gate these beams S S are provided with suitably-mounted friction rollers or wheels $u$, against which said gate moves as it rises and falls. The beams S are adjusted to bring the rollers $u$ properly against the gate by means of adjusting-screws V, arranged in vertical beams $v$, which are firmly fixed to the walls of the chute. The rollers $u$ perform a very important office in relieving the gate from the friction which it would have against stationary bearings, the outward pressure of said gate being, as will readily be understood, very great, owing to the pressure of the water behind it.

Upon the back of the gate A, near its opposite vertical edges, are secured metal plates W, extending from top to bottom, and in the outer surface of each of these plates is a vertical groove, $w$. Into these grooves $w$ fit the correspondingly-shaped edges of vertical bars X, which may be formed of wood with their bearing edges faced with metal. The edges of these bars are forced into the grooves $w$ with any desired pressure by means of adjusting-screws $x'$ $x'$, arranged in vertical beams Y, secured to the walls of the chute. The bars X move in casings formed by suitable boards $y$ projecting from beams Y, and serving to maintain the bars X against sidewise movement, and also to prevent water from flowing behind said bars. By means of the edges of the bars X fitting snugly in the grooves $w$ all leakage of water around the vertical edges of the gate is prevented. The adjusting devices of the beam S, carrying the friction-rollers, and of the bars X, may be dispensed with, if desired, and said beams and bars may be fixed in position without departing from our invention.

In the modification illustrated by Figs. 4 and 5 the friction-pulleys $u'$ are secured to the gate and bear outward against the adjustable beams S', and the bars X' are secured to the back of the gate and have their rounded outer edges fitted to slide in similarly-shaped vertical grooves in vertical timbers Y'.

In the modification illustrated by Figs. 6 and 7 provision is made for giving the leak-preventing bars an elastic pressure against the back of the gate. In Fig. 7, which is a top view, the bar $X^2$ is shown arranged to move between the casing-boards $y$ $y$; but in Fig. 6 the outer one of these boards is omitted for the purpose of showing the parts in rear of its position. Within the casing—that is, between the two boards $y$ $y$ and between the vertical timber Y and the back of the bar $X^2$—is arranged an adjustable vertical bar, $X^3$. To its face next the box $X^2$ this bar $X^3$ has secured at their centers two strong bow-springs, $x^2$, the projecting ends of which bear against the back of bar $X^2$. When the adjusting-screws $x'$ are screwed inward against bar $X^3$ the springs force bar $X^2$ against the gate, or, more precisely speaking, against the plates W, said bars $X^2$ having thus a yielding or elastic pressure, which will bring them well against their bearings without overstraining the beams Y, and even though the gate should by any means be thrown out of a true vertical position.

The bearings for preventing leakage may be arranged on either face of the gate, as desired. When on the outer face the rollers will be dispensed with.

The water rising in the dam, pond, or stream, as the case may be, is prevented from overflowing its banks by flowing through branch-pipe E', and to pipe E through said branch or through either of the other branches, according to the head of water desired in the dam, the cocks being used to direct the flow through the proper branch. The water will flow down through pipe E into the cylinder B outside the embankment, pressing by its weight upon the piston within the cylinder, which, with its descent or downward stroke, will pull upon chain F and the outer end of the gate-lever D, the inner end of which rises and draws upon the chain $n$ first, the chain $a$ of the main gate being left normally slack, so that it will not be stretched until after the gate N has been raised by chain $n$. As the gate N opens the water flowing through the sluice M and pipe M' starts the water-wheel of motor O, which operates, through the shaft $q$, the rotary pump P, which, then receiving water through pipe $E^5$, forces additional water under high pressure into the cylinder B, causing the piston to move with increased force and rapidity, so that the main gate A is then easily and rapidly raised, thus permitting a sufficient quantity of water to escape under said gate to bring the head of water in the dam down to its proper level, when the gate will again close and remain closed until the water shall rise to a sufficient height to repeat the operation. The water within the cylinder is discharged between the annular space surrounding the piston down into the lower part of the cylinder and out through its bottom.

The increased rapidity and force of action of the gate-lifting devices is of great importance at times when the water is rising rapidly in the dam from the effect of heavy rains and freshets, and these devices enable the use of heavier and more substantial gates than are practicable where the head of water in the dam is alone depended upon for power. The branch pipe E' passes through the embankment at about low-water mark, or it may be below freezing-point, if desired; but by closing the cocks $e'$ and $e^2$ the water in the pond or stream may be permitted to rise to a level with the top branch, $E^3$, before water will flow through said branch and operate the piston; or by closing cock $e'$ and leaving cock $e^2$ open water will be drawn off on a level with a branch, $E^2$. The aperture $e$ in branch $E^3$ is to admit air, and thus prevent siphonic action of the pipes.

The cylinder B may be made of any desired length to produce a proper movement of lever D, and said cylinder may be placed in a horizontal position if found convenient.

The lever D may be dispensed with, and the chain or a suitable cable may be run from the gate over suitably-supported guide-pulleys direct to the piston-rod, so that movement of the piston will communicate motion directly through its rod and the chain or cable to the gate. In this case the chain or cable should be slack when the gate is down, and a branch cord or chain connected with the main chain or cable should run over a suitable pulley to the small sluice-gate and be taut when the gates are down, so that when the cable is drawn the small gate will be raised before the slack in the main chain or cable is taken up.

We do not confine ourselves to the devices shown for increasing the force of the water-supply to the cylinder, as any suitable apparatus operated by the water from the sluice may be used for that purpose without departing from our invention.

What we claim is—

1. A mechanism for automatically controlling or regulating the head or level of water in a water-course or mill-pond, composed of an outflow-pipe and devices operated by the water therefrom to open the gate of a sluice, and devices operated by the water from said sluice to open a main gate, substantially as set forth.

2. The combination, with the gate A, cylinder B and its piston, a pipe leading from the water to said cylinder, and suitable intermediate devices for connecting said piston with said gate, of a sluice or water-way arranged to be opened by said intermediate devices prior to their action on the main gate, and devices arranged to be operated by the water from said sluice to force additional water into said cylinder, substantially as described, and for the purpose set forth.

3. The combination, with the gate A, connected lever D, cylinder B, its piston connected with said lever, and supply-pipe E, of the sluice M, gate N, connected to lever D to open in advance of gate A, water-motor O, and pump P, connected with the cylinder by a suitable pipe and arranged for operation by said motor, substantially as described.

4. The combination, with the gate A, of the suitably-supported friction roller or wheels $u$, arranged to turn against suitable bearings, and devices for regulating the pressure between said rollers or wheels and bearings, substantially as described, and for the purpose set forth.

5. The combination, with the gate A, having the grooves $w$, of the bars X, having their edges fitting in said grooves, substantially as and for the purpose set forth.

6. The combination, with the gate A, of the suitably-supported friction-rollers $u$ and the bars X, arranged to bear upon the back of said gate, substantially as described.

7. The combination, with the chute-walls, the vertically-sliding gate A, and stationary vertical bearings arranged to come in contact with one of the faces of said gate near its vertical edges, of suitable means for preventing the flow of water between said bearings and the chute-walls, and devices for controlling the pressure between said gate and bearings, substantially as described.

8. The combination, with the gate A, of a friction-bearing having a yielding or elastic pressure upon said gate, substantially as described.

9. The combination, with the cylinder B and its piston, of the main pipe E, having branch E', arranged to pass through the embankment, the vertical pipe $E^4$, leading from said branch, and the branches $E^2$ $E^3$, connecting the main pipe with said vertical pipe, the lower branches being provided with suitable cut-off cocks, substantially as described.

10. The combination, with the gate A, of the bar $X^2$ and suitable springs arranged to bear upon said bar, substantially as described.

11. The combination, with gate A, of the bar $X^2$, bar $X^3$, springs $x^2$, the casing inclosing said bars and springs, and the adjusting-screws $x'$, bearing on said bar $X^3$, substantially as described.

In testimony whereof we have hereunto set our hands in the presence of two subscribing witnesses.

JOHN J. LÜCK.
HENRY B. BATEMAN.

Witnesses:
H. L. WOLCOTT,
J. E. HARGRAVE.